US009122871B2

(12) United States Patent
Bellahcene et al.

(10) Patent No.: US 9,122,871 B2
(45) Date of Patent: Sep. 1, 2015

(54) METHOD AND DEVICE FOR MANAGING AN ARRAY OF KEYS, WITH PROTECTION AGAINST AN ACTIVE SPY DEVICE, COMPUTER PROGRAM PRODUCT AND STORAGE MEANS CORRESPONDING THERETO

(71) Applicant: Compagnie Industrielle et Financiere D'Ingenierie "Ingenico", Paris (FR)

(72) Inventors: Mohammed Bellahcene, Lyons (FR); Olivier Benoit, Malissard (FR); Jean-Jacques Delorme, Saint-Marcel-les-Valence (FR)

(73) Assignee: Ingenico Group, Paris (FR)

( * ) Notice: Subject to any disclaimer, the term of this patent is extended or adjusted under 35 U.S.C. 154(b) by 0 days.

(21) Appl. No.: 14/356,298

(22) PCT Filed: Oct. 29, 2012

(86) PCT No.: PCT/EP2012/071368
§ 371 (c)(1),
(2) Date: May 5, 2014

(87) PCT Pub. No.: WO2013/064453
PCT Pub. Date: May 10, 2013

(65) Prior Publication Data
US 2014/0259165 A1 Sep. 11, 2014

(30) Foreign Application Priority Data
Nov. 4, 2011 (FR) ..................................... 11 60022

(51) Int. Cl.
*G06F 11/00* (2006.01)
*G06F 21/55* (2013.01)
*G06F 21/83* (2013.01)
(52) U.S. Cl.
CPC .............. *G06F 21/554* (2013.01); *G06F 21/83* (2013.01); *G06F 2221/034* (2013.01)

(58) Field of Classification Search
CPC .. G06F 21/554; G06F 21/83; G06F 2221/034
USPC .......................................................... 726/22
See application file for complete search history.

(56) References Cited

U.S. PATENT DOCUMENTS 6,426,710 B1 7/2002 Chang et al.

FOREIGN PATENT DOCUMENTS

| DE | 19959163 A1 | 6/2000 |
| EP | 0248712 A1 | 12/1987 |
| EP | 0573719 A1 | 12/1993 |
| GB | 2190775 A | 11/1987 |

OTHER PUBLICATIONS

International Search Report dated Jan. 16, 2013 for corresponding International Application No. PCT/EP2012/071368, filed Oct. 29, 2012.
French Search Report dated Jul. 4, 2012 for corresponding French Application No. 1160022, filed Jun. 4, 2011.
English translation of the International Preliminary Report on Patentability dated May 19, 2014 for corresponding International Application No. PCT/EP2012/071368, filed Oct. 29, 2012.

Primary Examiner — Mohammad W Reza
(74) Attorney, Agent, or Firm — David D. Brush; Westman, Champlin & Koehler, P.A.

(57) ABSTRACT

There is proposed a method of managing an array of keys by a device, each key pressed short-circuiting a row and a column of the array. During at least part of a time slot lying between two successive iterations of a sweep phase, the device performs a first protection mechanism, including reading a logic value on at least one row or column, and detecting an attempted illicit sweep as a function of the logic value read, and/or a second protection mechanism, including writing an arbitrary logic value, equal to or different from the predetermined logic value, on at least one row or column, so as to prevent an attempted illicit sweep.

7 Claims, 10 Drawing Sheets

METHOD AND DEVICE FOR MANAGING AN ARRAY OF KEYS, WITH PROTECTION AGAINST AN ACTIVE SPY DEVICE, COMPUTER PROGRAM PRODUCT AND STORAGE MEANS CORRESPONDING THERETO

1. CROSS-REFERENCE TO RELATED APPLICATIONS

This Application is a Section 371 National Stage Application of International Application No. PCT/EP2012/071368, filed Oct. 29, 2012, which is incorporated by reference in its entirety and published as WO 2013/064453 on May 10, 2013, not in English.

2. FIELD OF THE INVENTION

The field of the invention is that of matrix keyboards or keypads, i.e. keypads comprising a matrix of keys enabling a user to key in or enter characters (letters, figures, symbols, etc.).

More specifically, the invention concerns a technique for the secured management of a matrix of keys such as this by a device (for example a processor) in order to determine a key or keys pressed by the user. This technique is also called a "keyboard or keypad scan routine".

The invention can be applied especially but not exclusively to the keypad of a payment terminal used to pay for purchases of goods and services. In this case, the keypad is used by the salesman to enter the amounts of the transactions and also by the customers to enter their confidential codes (PIN or Personal Identity Numbers).

The invention is not limited to a particular type of keypad and is applicable whatever the number and nature of the keys of the keypad (numerical keys, function keys, etc).

3. TECHNOLOGICAL BACKGROUND

FIG. 1 shows an example of a numerical keypad comprising a matrix of keys connected to a processor 10. In this example, the matrix of keys comprises ten keys (associated with the digits 0 to 9), four rows (referenced LIG0 to LUIG3) and three columns (referenced COL0 to COL2). Each key, when pressed, enables a row and a column of the matrix to be short-circuited. For example, when the key associated with the digit 6 is pressed, it short-circuits the row LIG1 and the column COL1.

For the processor 10, the classic technique for managing a matrix of keys is to perform several successive iterations of a scan phase. FIG. 2 illustrates two successive iterations referenced $T_n$ and $T_{n+1}$ respectively. Each iteration of the scan phase comprises the following steps for each of the rows LIG0 to LIG3 processed successively:

writing a predetermined logic value (logic level "0" in the example of FIG. 2) to the row; and
   for each column COL0 to COL2, reading a logic value in the column to determine whether the column is short-circuited with the row, by comparison between the logic value read and the predetermined logic value.

In other words, when the processor executes an iteration of the scan phase, it writes to the rows one by one and reads the columns simultaneously. The processor can thus detect the fact that only one key has been pressed or else that several keys have been pressed simultaneously.

In the example of FIG. 2, and here below in the description, the writing to the rows and the reading in the columns are done at logic level "0" in assuming that the rows and the columns are at the default logic value "1". It is clear however that the principle remains the same if the use of the logic levels "0" and "1" is reversed (i.e. if the writing to the rows and the reading on the columns are done at the logic level "1" assuming that the rows and columns are at the default logic level "0").

The above formulation, which is based on a matrix of keys (matrix M) and the notion of operations of successive writing to the rows of this matrix M and of simultaneous reading in the columns of this matrix M, is considered to be a generic formulation. Indeed, there is an alternative in which writing is done successively in the columns of this matrix M and reading is done simultaneously in the rows of this matrix M. However, this alternative can be carried out according to the previous formulation if we consider a new matrix M' in which the rows correspond to the columns of the matrix M and the columns correspond to the rows of the matrix M.

In the example of FIG. 2, it is assumed that the key 6 is pressed. The processor therefore detects a short circuit between row LIG1 and the column COL1 and deduces from this that the key 6 situated at the intersection between this row LIG1 and this column COL1 has been pressed.

There is a need to make the classic technique for managing a matrix of keys (i.e. the classic keypad scan routine) secure.

This question is raised in the patent document FR2599525, which points to a risk that malicious individuals might try to intercept a confidential code when the operation passes from the keypad to means for the matrix analysis of the keypad, by row and by column. Later in the description, these means are also called a device for managing the matrix of keys, or again a processor. The document FR2599525 specifies that knowledge of the waveform of the signals of analysis of the keypad enable a snooper or spy device to immediately make a traceback to any confidential information struck on the keypad. To snoop on the keypad, it is enough for the passive snooper device to have a few connections (through probes) with the rows and columns of the matrix of keys of the keypad. Snooping on the signals present in the rows and columns of the matrix can also be done by analysis of electromagnetic rays known as electromagnetic analysis or EMA. However, it is assumed that the signals flowing within the device for managing the matrix of keys are relatively complex, thus making it difficult for them to be used to retrieve confidential information struck on the keypad. For this reason, the device for managing the matrix of keys is called a "protected module" in the document FR2599525.

In order to improve the security of the keypad, the document FR2599525 proposes that the device for managing the matrix of keys (the "protected module") should apply countermeasures to hinder the possibility of interception of any confidential information (a confidential code for example) struck on the keypad through snooping on the state of the rows and columns of the matrix of keys of the keypad.

More specifically, the technique proposed by the document FR2599525 combines the following:

a first mechanism for simulating: the protected module is provided with two-way links towards at least certain of the columns and rows of the keypad and the protected module comprises means for simulating a false activation of keys, at least some of the interrogation pulses being applied at the same time to at least one row and at least one column;

a mechanism for the true exploration of the keypad: the protected module explores the keypad key by key, in scrutinizing at each time a row or a column known as an "effectively analyzed" row or column, that receives no interrogation pulse (coming from the protected module). During this true exploration, the invention also proposes a complementary simulation when the protected module is in the presence of a non-transference of the start of the interrogation pulse to the column or row analyzed (i.e. one or more explored keys are not actuated): the protected module then responds to this condition by applying a dummy pulse to the column or row analyzed which ends with the interrogation pulse (the start of this pulse being, on the contrary, slightly delayed relative to the start of the interrogation pulse, given the decision time needed for the protected module);

a second simulation mechanism: the protected module carries out no true interrogation of a chosen key during a predetermined time corresponding to the normal time of actuation of a key and, during this same period, it creates a false response which can be attributed to this chosen key.

Two embodiments of these mechanisms are proposed: in the first embodiment, the protected module is provided with two-way links towards all the columns of the keypad; in the second embodiment, the protected module is provided with two-way links towards all the rows and all the columns of the keypad.

While the technique of the document FR2599525 improves the security of the keypad in the face of a passive snooper device, it is however not optimal. Indeed, it proposes countermeasures during each iteration of the scan phase, but does not touch on the securing of the keypad during each time slot between two successive iterations of the scan phase performed by the processor (this time slot is called, here below in the description, a "intermediate time slot").

Now, in a context such as the one represented in FIG. 3, there is a risk of snooping on the keypad during the intermediate time slot (referenced IT) if an active snooper device 11 is connected by probes to the rows and columns of the matrix of the keys of the keypad. Indeed, as shown in FIG. 4, the active snooper device 11 (unlike a passive snooper device) can snoop on the keyboard overcoming countermeasures if it itself performs an iteration of the scan phase (this iteration with writing to the rows and reading on the columns is symbolized by the arrow referenced 41 in FIG. 4), during the intermediate time slot IT (i.e. between two successive iterations $T_n$ and $T_{n+1}$ of the scan phase performed by the processor 10).

4. SUMMARY OF THE INVENTION

One particular embodiment of the invention proposes a method for the management, by a device, of a matrix of keys comprising at least one row and at least two columns, each key for its part when pressed, enabling the short-circuiting of a row and a column of said matrix, the method comprising at least two iterations of a scan phase comprising the following steps for each of the rows processed successively:

writing a predetermined logic value to the row; and for each column, reading a logic value in the column to determine whether the column is short-circuited with the row, by comparison between the logic value read and the predetermined logic value, during at least one part of a time slot included between two successive iterations of the scan phase, the device carries out at least one mechanism of protection belonging to the group comprising:

a first mechanism of protection consisting in reading a logic value on at least one row or column, and detecting an attempt at illicit scanning as a function of the logic value read;

a second mechanism of protection consisting in writing an arbitrary logic value, equal to or different from the predetermined logic value, to at least one row or column, so as to prevent an attempt at illicit scanning.

Thus, the device for managing the matrix of keys of the keypad implements a mechanism of protection (or a combination of several mechanisms of protection) enabling the securing of the keypad during the intermediate time slot, situated between two successive iterations of the scan phase performed by the management device. The first and second mechanisms are not of a same nature: one is aimed at detecting an attempt at illicit scanning (of the matrix of keys of the keypad) by an active snooper device, while the other seeks to prevent such an attempt at illicit scanning.

The above formulation, which is based on a matrix of keys (matrix M) and the notions of successive operations of writing (during T) to each of the rows of this matrix M and operations of reading (during T1) and writing (during T2) to each of the columns of this matrix M, is generic. Indeed, there is an alternative which consists in successively writing (during T) to each of the columns of this matrix M and in reading on (during T1) and writing to (during T2) each of the rows of this matrix M. However, this alternative can be processed according to the previous formulation if we consider a new matrix M' in which each the rows correspond to the columns of the matrix M and the columns correspond to the rows of the matrix M.

According to a first particular mode of implementation, in the first mechanism of protection, an attempt at illicit scanning is detected if the logic value read is the predetermined logic value.

In this first particular mode of implementation, the device for managing the matrix of keys seeks to detect an attempt at illicit scanning by an active snooping device which writes and reads the logic levels (typically a signal has a logic level "0" if its voltage below a first threshold and has a logic level "1" if its voltage is above a second threshold).

According to one particular characteristic, the device carries out the first mechanism of protection throughout said time slot.

Thus, the keyboard is secured throughout the intermediate time slot.

According to one particular characteristic, the device carries out the first mechanism of protection on all the rows and columns.

In this way, the securing of the keyboard is further improved.

According to a second particular embodiment, the device carries out the second mechanism of protection throughout said time slot.

In this second particular implementation, the device for managing the matrix of keys tries to prevent an attempt at illicit scanning by an active snooper device which writes and reads the analog signals not considered to be logic levels (typically, an analog signal does not have a logic level "0" if its voltage is not below a first threshold and does not have a logic level "1" if its voltage is not above a second threshold).

According to one particular characteristic, the device carries out the second mechanism of protection on all the rows and columns.

In this way, the securing of the keyboard is further improved.

According to one particular characteristic, the second mechanism of protection consists in writing an arbitrary logic value which changes within said time slot and/or from one intermediate time slot to another.

Thus, the process of learning by a snooper device is made more complex.

According to one particular characteristic, the change in arbitrary logic value within said time slot and/or from one intermediate time slot to another is random.

Thus, the process of learning by a snooper device is made more complex.

According to a third particular embodiment, the device carries out the second mechanism of protection on at least one given row or column during at least one part of the time slot, except during at least one detection time interval. Furthermore, during each detection time interval, a device carries out the first mechanism of protection consisting in reading a logic value on said at least one given row or column, and detects an attempt at illicit scanning if the logic value read is different from said arbitrary logic value written by the second mechanism before said detection time interval, each row or column to which the device writes in carrying out the second mechanism of protection being placed in a state of low impedance and each row or column on which the device reads in carrying out the first mechanism of protection being placed in a state of high impedance.

In this third particular embodiment, the device for managing the matrix of keys attempts:
- during the intermediate time slot, except for the detection time intervals, to prevent an attempt at illicit scanning by an active snooping device which writes and reads analog signals not considered to be logic levels; and
- during the detection time interval or intervals, to detect an attempt at illicit scanning by an active snooper device which injects currents into the rows (of the matrix of keys) that are strong enough to generate a voltage measurable by analog means.

According to one particular characteristic, the number and/or position and/or duration of the detection time interval or intervals varies randomly from one intermediate time slot to another.

In this way, a hacker is prevented from circumventing, by a learning process, the first mechanism of protection carried out during each detection time interval.

According to one particular characteristic, the second mechanism of protection consists in writing an arbitrary logic value which changes within said time slot and/or from one intermediate time slot to another.

Thus, the learning by a snooper device is made more complex.

According to one particular characteristic, the change in arbitrary logic value within said time slot and/or from one intermediate time slot to another is random.

Thus, the learning by a snooper device is made more complex.

According to one particular characteristic, the device carries out the second mechanism of protection throughout said time slot, except during said at least one detection time interval, the device carrying out the first mechanism of protection during each detection time interval.

Thus, the keyboard is secured throughout the intermediate time slot.

According to one particular characteristic, the device carries out the first and second mechanisms of detection on all the rows and columns.

In this way, the securing of the keypad is further improved.

Another embodiment of the invention proposes a computer program product comprising program code instructions for implementing the above-mentioned method (in any one of its different embodiments) when said program is executed on a computer or a processor.

Another embodiment of the invention proposes a computer-readable and non-transient storage medium storing a computer program comprising a set of instructions executable by a computer or a processor to implement the above-mentioned method (in any one of its different embodiments).

Another embodiment of the invention proposes a device for managing a matrix of keys comprising at least one row and at least two columns, each key making it possible, when it is pressed, to short-circuit a row and a column of said matrix, the device comprising means for scanning adapted to carrying out at least two iterations of a scan phase, the means for scanning comprising the following means, activated for each of the rows processed successively: means for writing a predetermined logic value to the row; and means for reading a logic value on each column to determine whether the column is shorted-circuited with the row, by comparison between the logic value read and the predetermined logic value. The device further comprises at least one means of protection activated during at least one part of a time slot included between two successive iterations of the scan phase, said at least one means of protection belonging to the group comprising:
- a first means of protection comprising means for reading a logic value on at least one row or column, and means for detecting an attempt at illicit scanning according to the logic value read;
- a second means of protection, comprising means of writing an arbitrary logic value, equal to or different from the predetermined logic value, to at least one row or column so as to prevent an attempt at illicit scanning.

Advantageously, the device for managing the matrix of keys comprises means for implementing steps that it carries out with the method as described here above in any one of its different embodiments.

5. LIST OF FIGURES

Other features and characteristics of the invention shall appear from the following description, given by way of an indicative and non-exhaustive example, and from the appended figures, of which:

FIG. 1, already described with reference to the prior art, presents an example of a numerical keypad comprising a matrix of keys connected to a processor;

FIG. 2, already described with reference to the prior art, illustrates the classic technique of management of the matrix of keys of FIG. 1, when the key 6 is pressed;

FIG. 3, already described with reference to the prior art, presents the connection of an active snooper device to the rows and columns of the matrix of keys of the keypad;

FIG. 4, already described with reference to the prior art, illustrates the risk of snooping on the keypad during the intermediate time slot by the active snooper device in FIG. 3;

6. DETAILED DESCRIPTION

Figure 1:
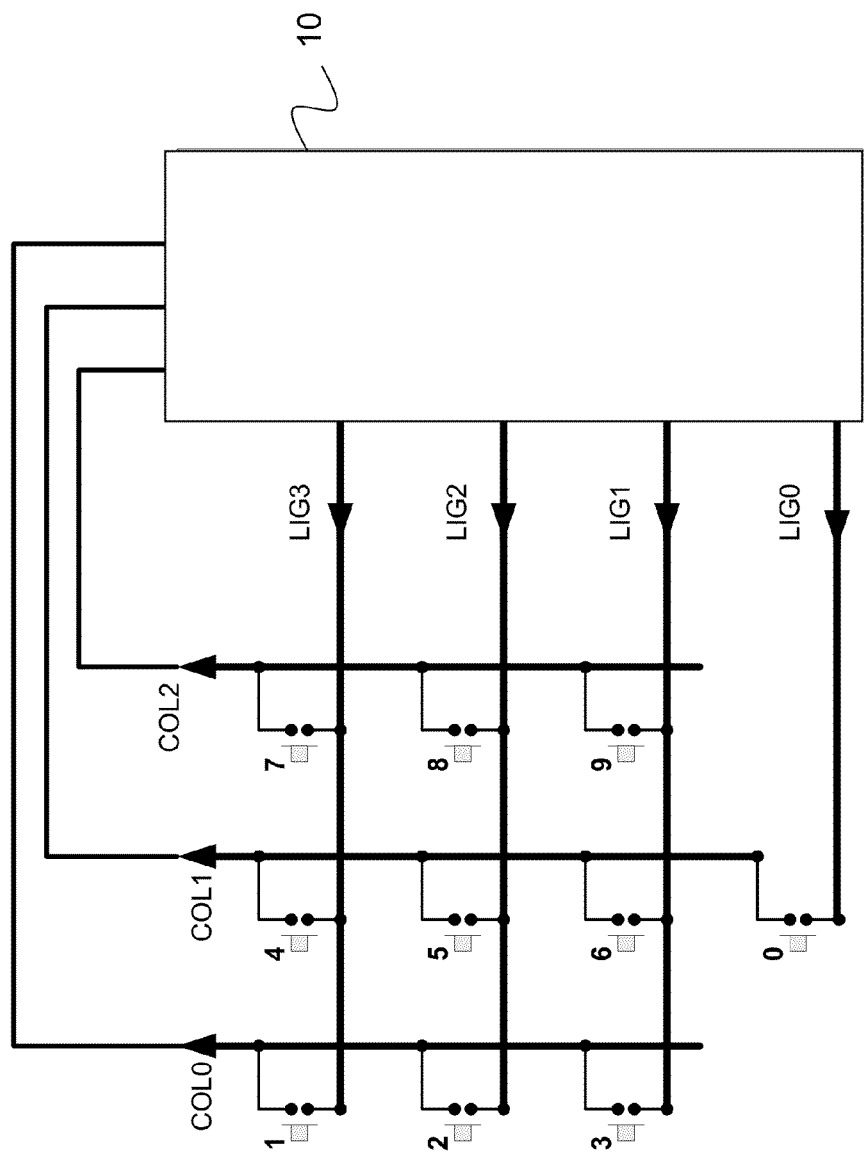
Figure 2:
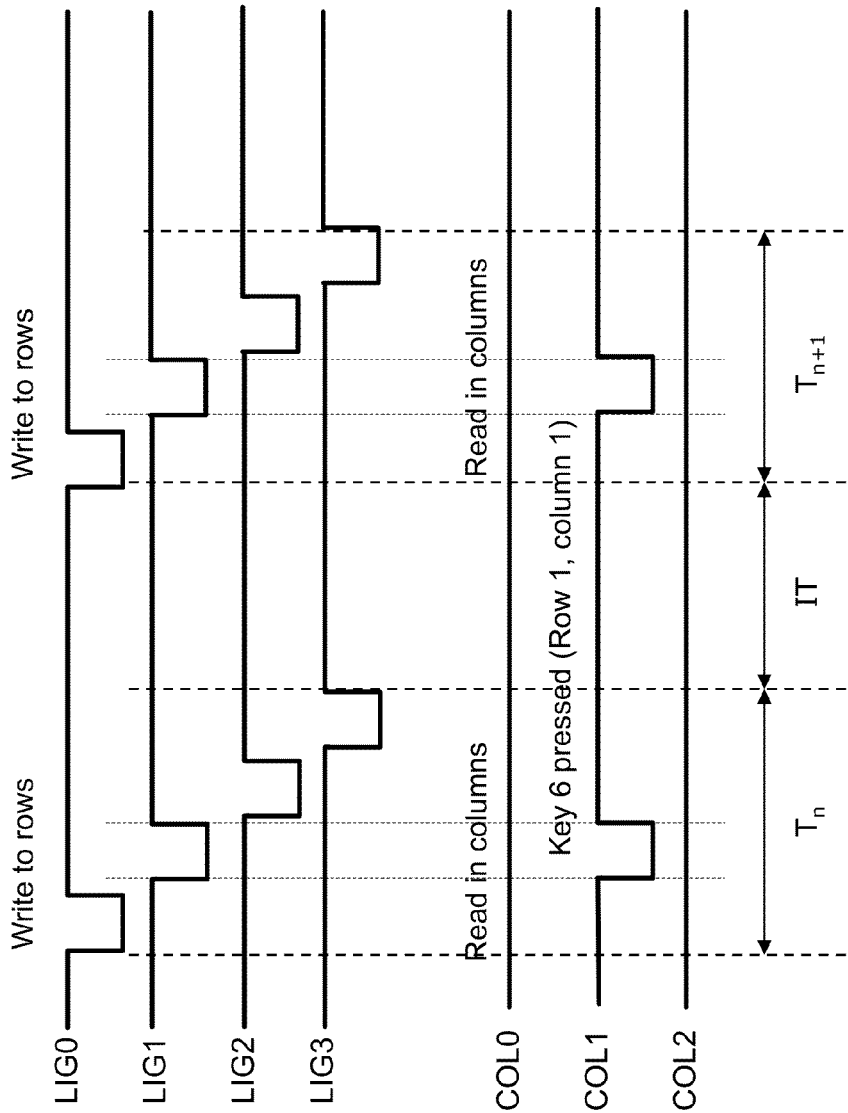
Figure 3:
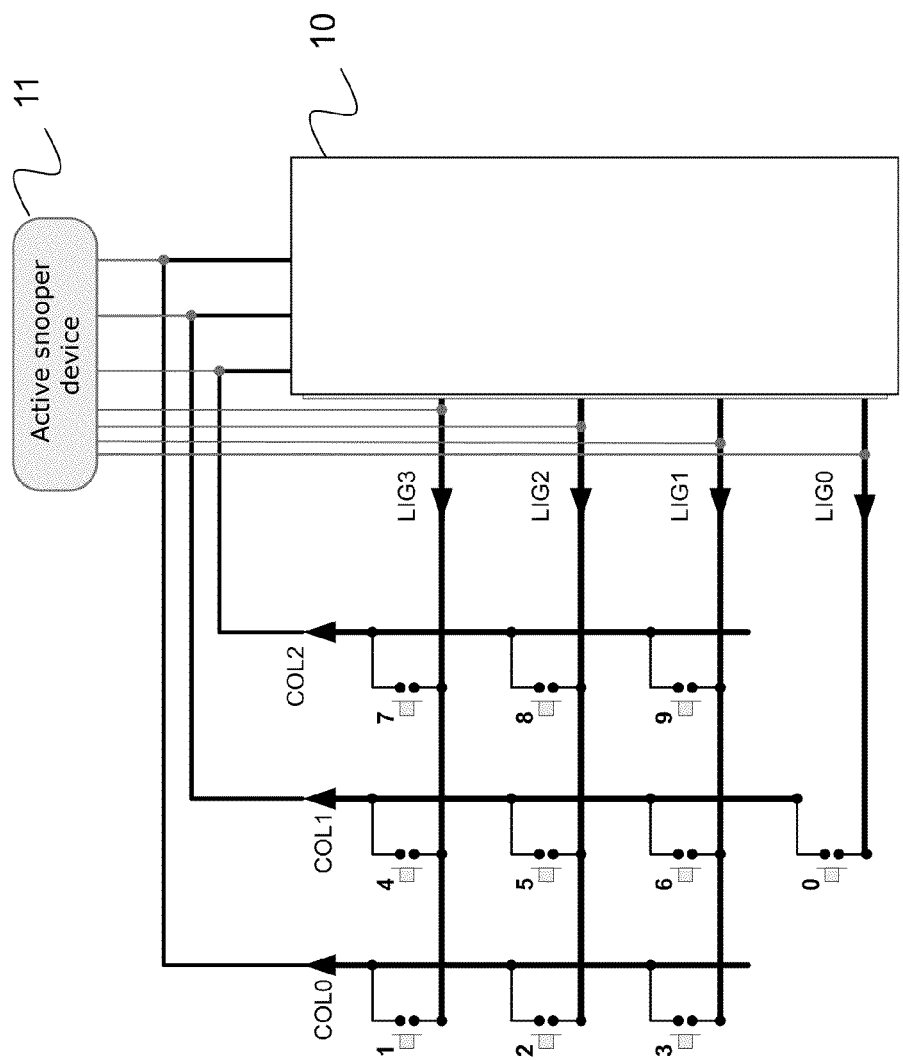

With a view to simplification, here below in the description, we use the example of the keypad of FIG. 1, with a matrix of keys corresponding to ten keys (associated with the digits 0 to 9), four rows (referenced LIG0 to LIG3) and three columns (referenced COL0 to COL2). It is clear that the technique presented here below, according to different embodiments of the invention, is not limited to this example of a keypad.

Each of the FIGS. 5 to 8 presents values of the signals present on the rows LG0 to LG3 and the columns COL0 to COL2 during two successive iterations (referenced $T_n$ and $T_{n+1}$) of the scan phase as well as during the intermediate time slot (referenced IT) situated between two successive iterations. FIG. 9 presents the values of the signals present on the rows LG0 to LG3 and the columns COL0 to COL2 solely during the intermediate time slot (referenced IT).

It is assumed here below in the description that the interrogation pulses have a logic level "0". It is clear however that the principle of the invention remains the same if the use of the logic levels "0" and "1" is inverted.

Figure 5:
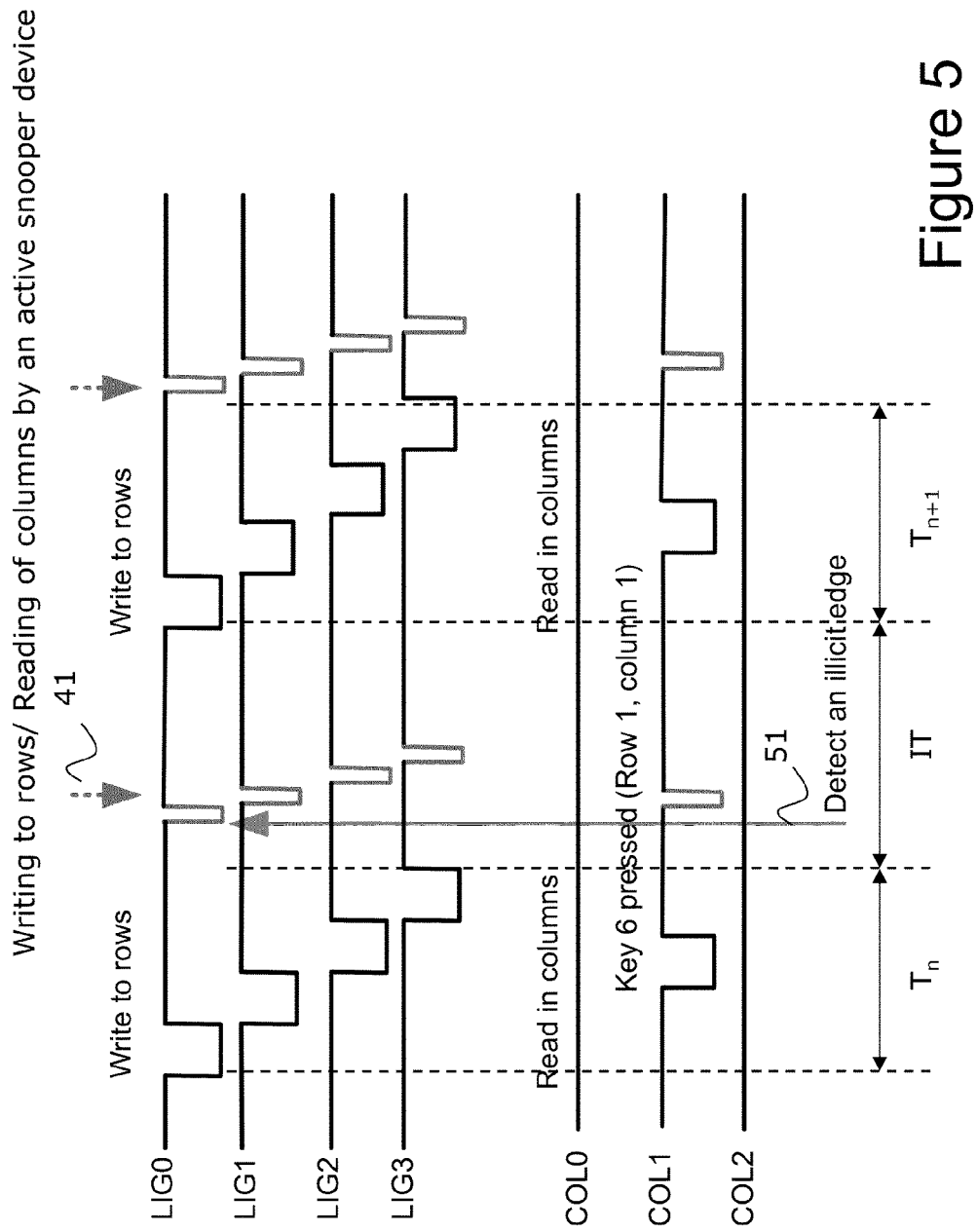
FIG. 5 illustrates a first embodiment of the method according to the invention.

Referring now to FIG. 5, we present a first embodiment of the method according to the invention.

Figure 4:
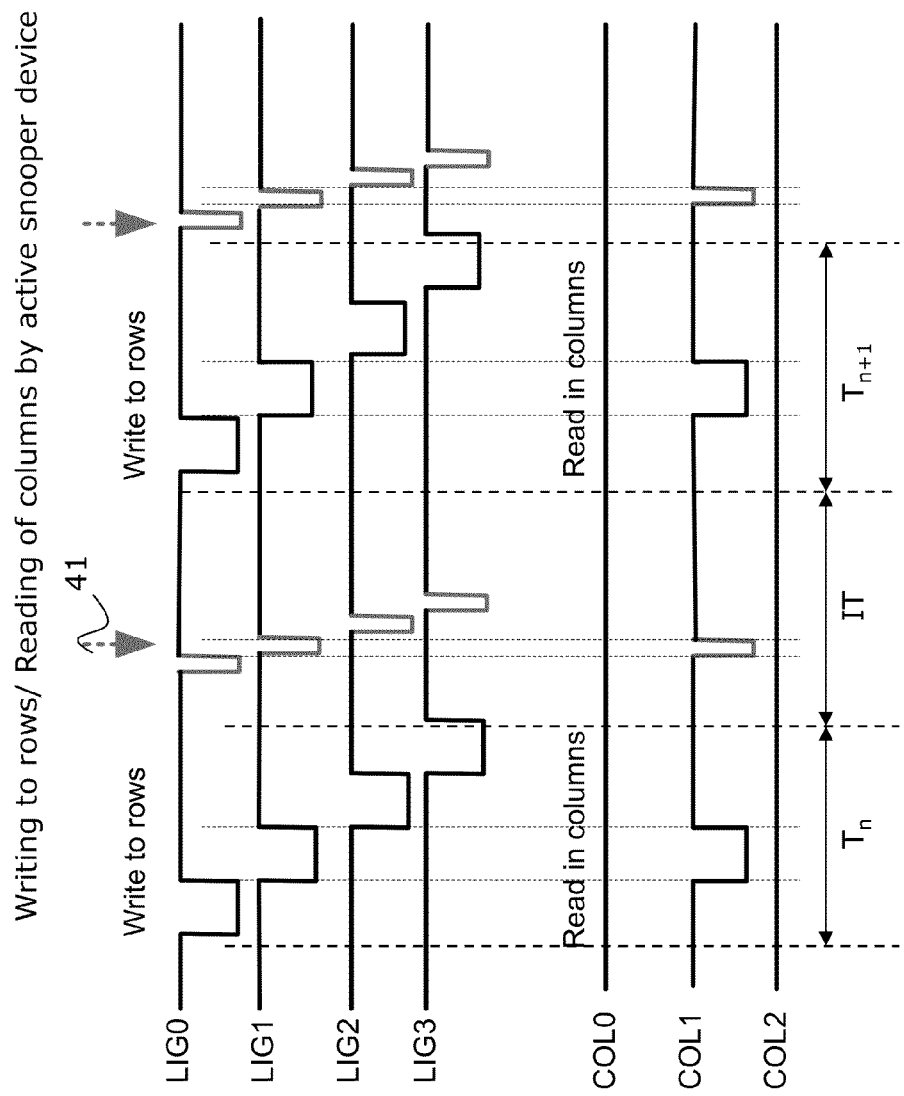

It is assumed, in the example of FIG. 4, that the active snooper device 11 snoops on the keyboard in itself performing an iteration of the scan phase (this iteration, with writing of a logic level "0" (interrogation pulse) to the rows and reading on the columns is symbolized by the arrow referenced 41), during the intermediate time slot IT (i.e. between two successive iterations $T_n$ and $T_{n+1}$ of the scan phase performed by the processor 10).

The technique proposed in the first embodiment of the invention consists, throughout the intermediate time slot IT, in reading the logic value present on each of the rows LG0 to LG3 and each of the columns COL0 to COL2 and detecting an illicit scan attempt if the logic value read (on at least one of the rows and columns) is the logic value "0" (logic level of the interrogation pulses).

In the example of FIG. 5, the processor 10 detects the trailing edge corresponding to the start of the writing, by the active spy device 11, of a logic level "0" (interrogation pulse) on the row LIG0. This detection is symbolized by the arrow referenced 51. The processor 10 deduces from this that there exists an attempt at illicit scanning of the keyboard so that every appropriate action or actions can be implemented (placing the apparatus under security (putting it out of service), activating an alarm (beep message, siren, etc), erasing sensitive information, making a report to a monitoring device for action, etc).

This first embodiment uses for example the possibilities of interruptions of the processor 10: between two successive iterations $T_n$ and $T_{n+1}$ of the scan phase, all the rows/columns of the keyboard are placed in a "input state" (i.e. in a state of reading by the processor 10) with interruption on a change in logic state. In the event of illicit scanning by an active snooper device 11, the processor 10 detects a change in logic level through its system for managing interruptions and memorizes an attempt at illicit keypad scanning. This mechanism of protection by management interruption is possible only on processors with inputs/outputs having possibilities of interruption.

In one variant, the processor 10 permanently scans the rows and columns to detect a change in logic level (this variant consumes more computer resources).

In another variant, the mechanism of protection according to the first embodiment is carried out only during a part of the intermediate time slot IT.

In another variant, the mechanism of protection according to the first embodiment is carried out only on certain rows and/or certain columns.

Figure 6:
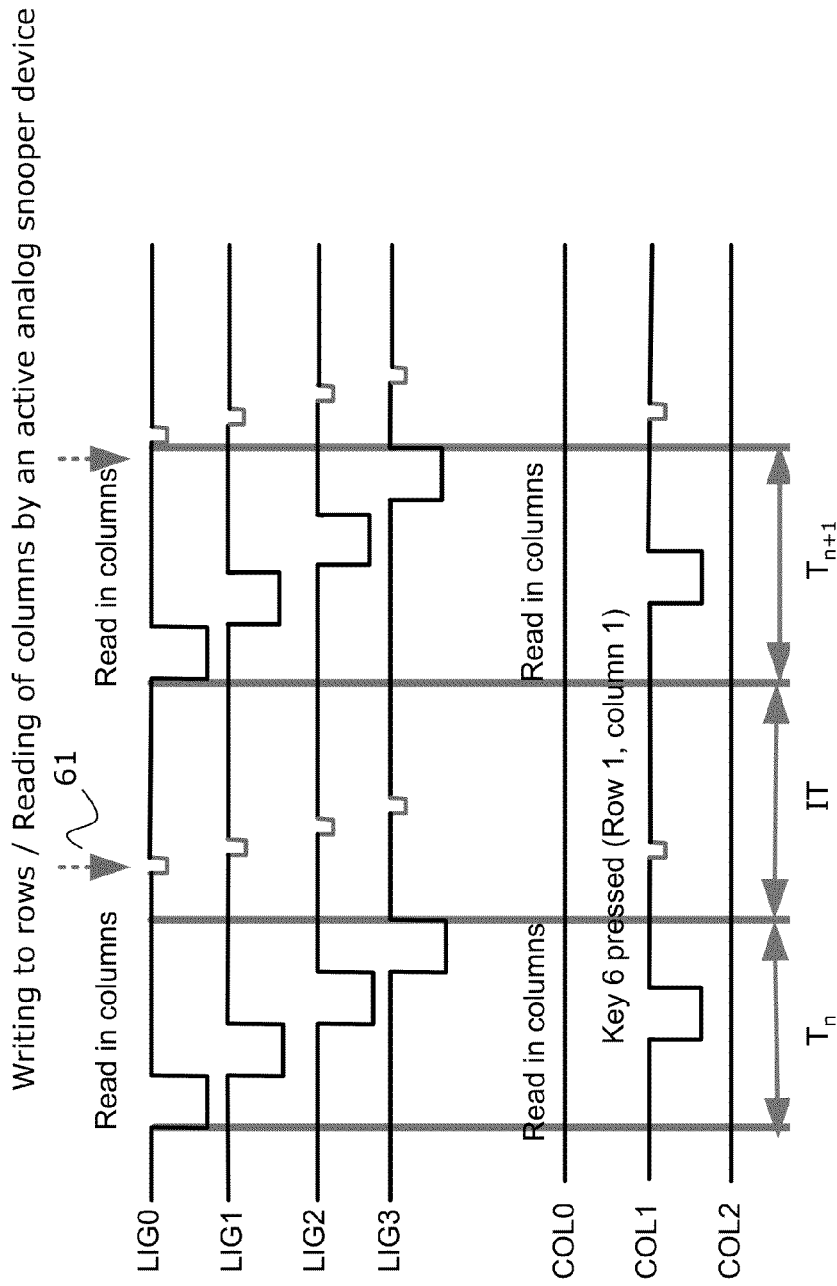
FIG. 6 illustrates a way of countering the first embodiment of FIG. 5.

FIG. 6 illustrates a way of countering the first embodiment of FIG. 5. This way of countering consists of the use of an analog active snooper device 11, i.e. an active snooper device with analog inputs, capable of working (in writing and reading mode) with analog signals that activate neither interruptions nor changes in logic state (analog signals not considered to have logic levels "0" because they remains at a voltage level above the threshold defining the logic level "0").

In FIG. 6, the iteration of the scan phase performed by the analog active snooping device 11 (with writing to the rows and reading on the columns of analog signals that trigger no interruption or change in logic state) is symbolized by the arrow referenced 61.

Figure 7:
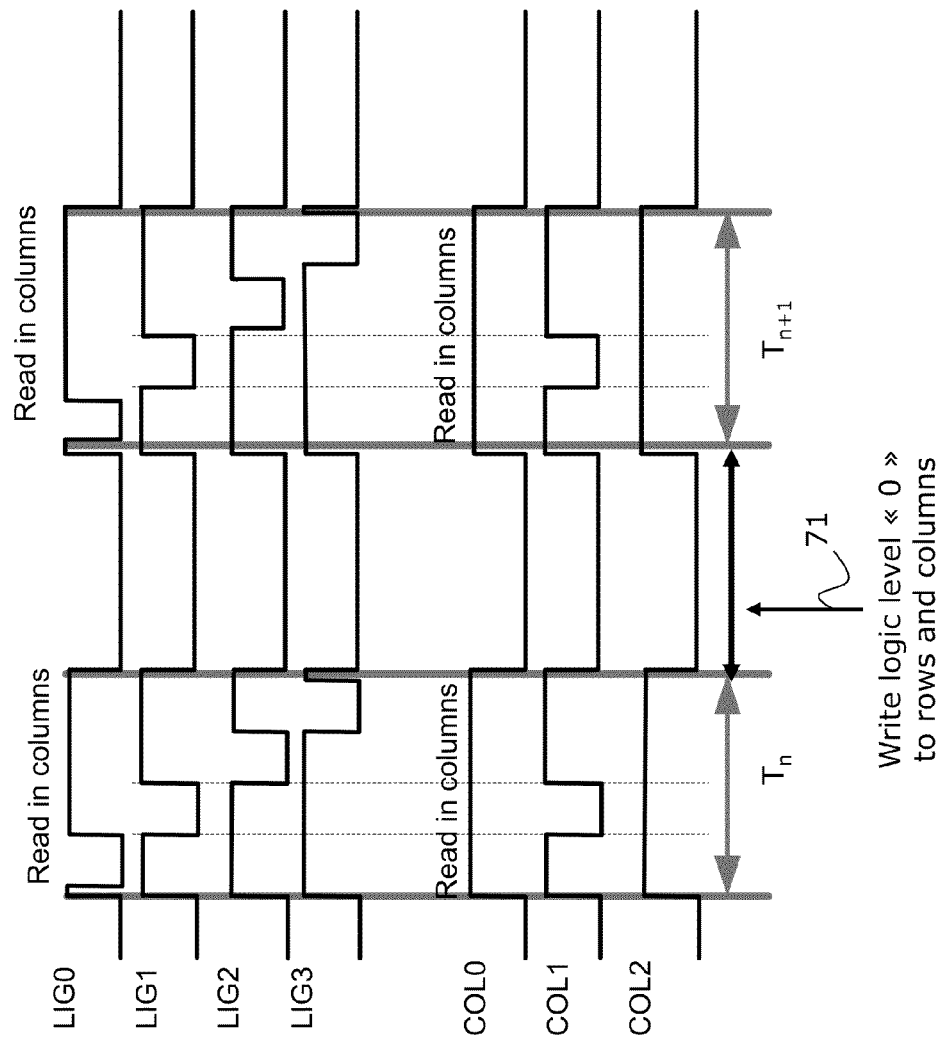
FIG. 7 illustrates the second embodiment of the method according to the invention.

Referring now to FIG. 7, we present a second embodiment of the method according to the invention making it possible to prevent the way of countering illustrated in FIG. 6.

The technique proposed in the second embodiment of the invention consists, throughout the intermediate time slot IT, in writing the logic level "0" to each of the rows LG0 to LG3 and each of the columns COL0 to COL2 (logic level of the interrogation pulses). This writing to the rows and the columns is symbolized by the arrow referenced 71. In other words, the processor 10 forces the levels of the rows LG0 to LG3 and columns COL0 to COL2 to a logic level "0" (the rows and columns being placed in an "output state", i.e. in a state of writing by the processor 10). To this end, the processor 10 blocks the rows and the columns at ground.

In one variant, the processor 10 forces the levels of the rows LG0 to LG3 and columns COL0 to COL2 to a logic level "1" throughout the intermediate time slot IT.

In another variant, the processor 10 forces the levels of the rows LG0 to LG3 and columns COL0 to COL2 to an arbitrary logic level which changes ("0" or "1") from one intermediate time slot IT to another. This change is preferably random in order to make the process of learning by the spy device more complex.

In another variant, the processor 10 forces the levels of the rows LG0 to LG3 and the columns COL0 to COL3 to an arbitrary logic level with changes ("0" or "1") which changes within the intermediate time slot IT. In other words, the processor 10 forces the logic level "0" during one or more first portions of the intermediate time slot IT and at the logic level "1" during one or more second portions of the intermediate time slot IT.

The change in arbitrary logic level (from one intermediate time slot IT to another and/or within the intermediate time slot IT) can be random in order to make the process of learning by a snooper device more complex.

In another variant, a mechanism of protection according to this second embodiment is done only during a part of the intermediate time slot IT.

In another variant, the mechanism of protection according to this second embodiment is done only on certain rows and/or certain columns.

Figure 8:
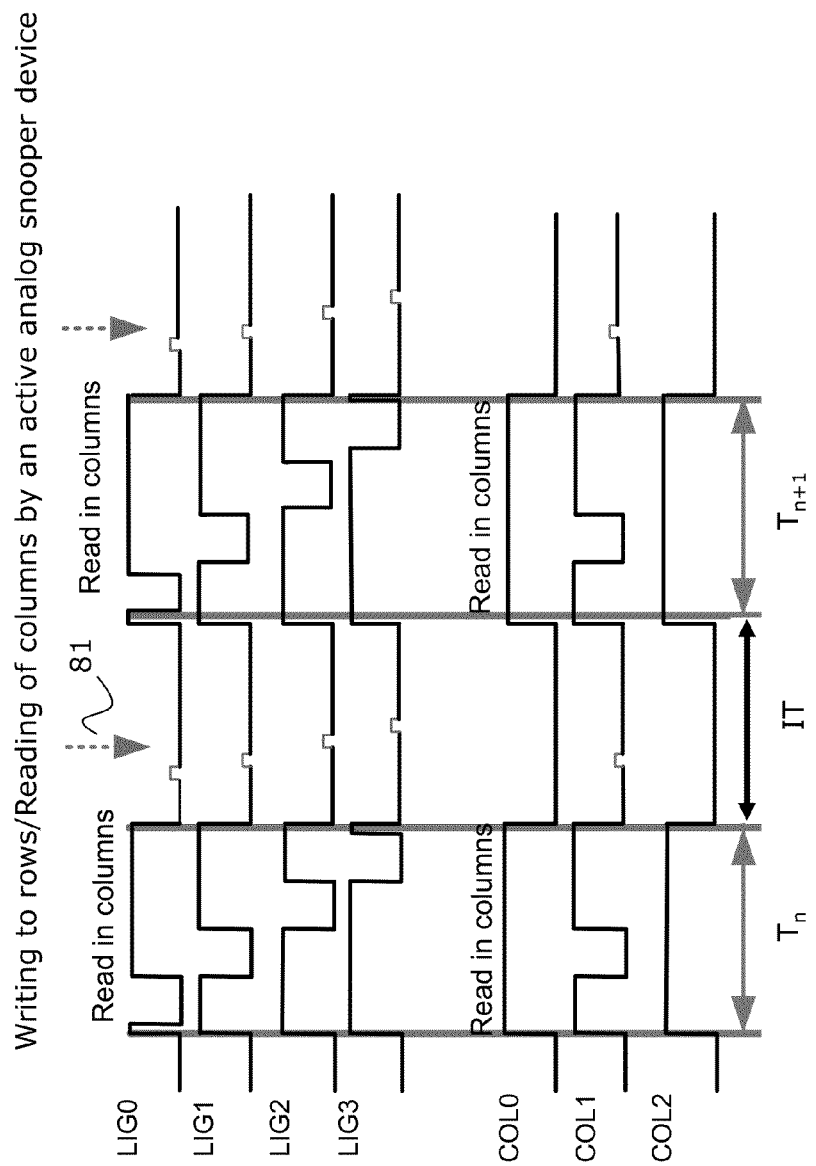
FIG. 8 illustrates a way of countering the second embodiment of FIG. 7.
Figure 9:
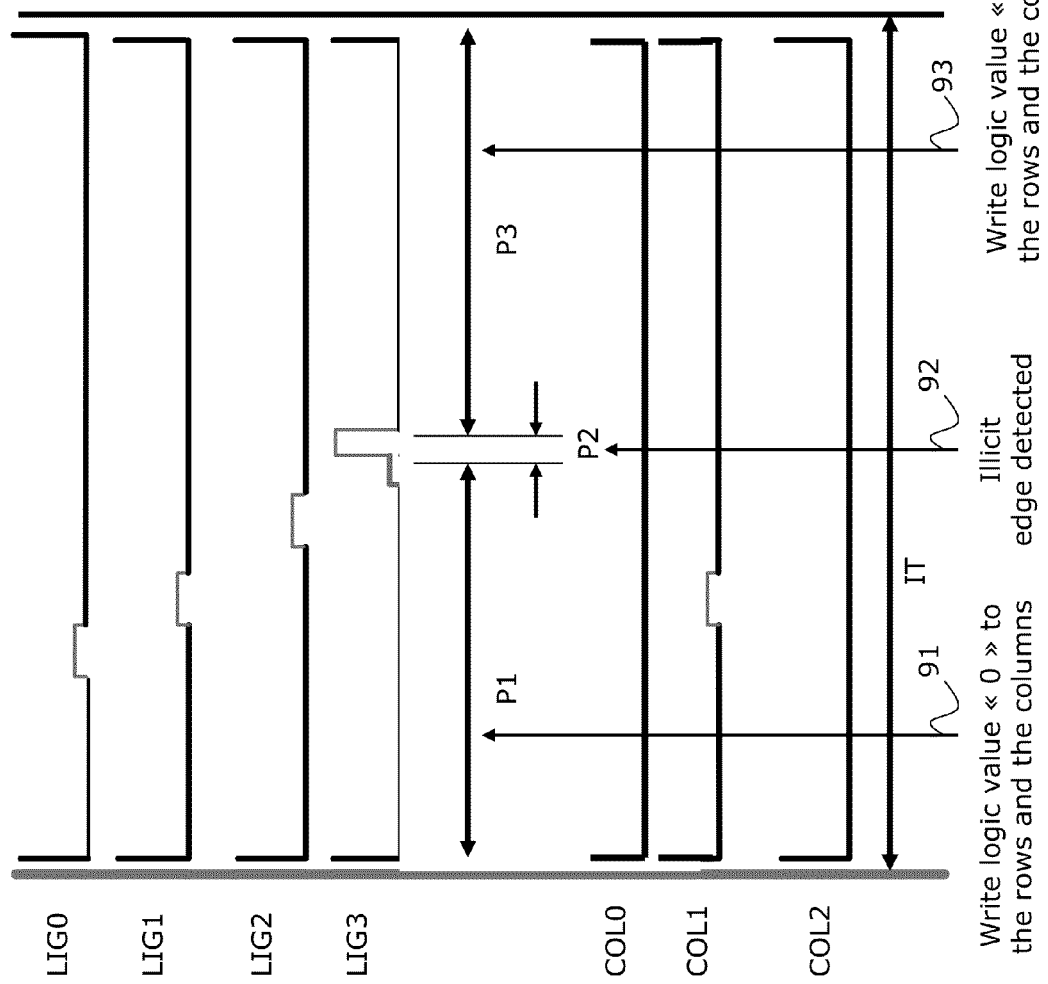
FIG. 9 illustrates a third embodiment of the method according to the invention.

FIG. 8 illustrates a way of countering the second embodiment of FIG. 7.

This way of countering uses an analog active snooper device 11, i.e. an active snooper device with analog inputs, capable of injecting currents into the rows LG0 to LG3 that are strong enough to generate a voltage measurable by analog means. It is indeed necessary to inject a sufficiently great current into a row to obtain a measurable voltage (i.e. in this case a voltage that is low but not zero), it being known that the impedance of a row placed in a "output state" (i.e. in write mode by the processor 10) is low (<1Ω).

In FIG. 8, the arrow referenced 81 symbolizes the iteration of the scan phase performed by the analog active spy or snooper device 11, with writing to the rows (and reading in the columns) of signals resulting from the injection into the rows LG0 to LG3 of sufficiently strong currents.

Referring now to FIG. 9, we present a third embodiment of the method according to the invention to prevent the way of countering illustrated in FIG. 8.

The technique proposed in the third embodiment of the invention consists in:
 implementing a first mechanism of protection throughout the intermediate time slot IT except during at least one detection time interval. This first mechanism is identical to the mechanism of protection according to the second embodiment, described here above with reference to FIG. 7 (including in the different variants described here above of this second embodiment); and
 implementing a second mechanism of protection during each detection time interval consisting in: reading the logic value present on each of the rows LG0 to LG3 and each of the columns COL0 to COL2 and detecting an attempt at illicit scanning if the logic value read (on at least one of the rows and columns) is different from the arbitrary logic value by the second mechanism before this detection time interval. In the example of FIG. 9, the arbitrary logic value "0" is written with the first mechanism and an attempt at illicit scanning is detected with the second mechanism if the logic value "1" is read. This second mechanism of protection uses for example the possibilities of interruptions of the processor 10 or else a permanent detection of a change in logic level).

Thus, at the start of each detection time interval (i.e. at the passage from the first to the second mechanism of protection), each row or column passes from a low-impedance "output state" (state of writing an arbitrary logic value "0" or "1" by the processor 10) to a high-impedance "input state" (state of reading by the processor 10). In practice, the change of impedance is almost instantaneous (through a processor instruction). This variation in impedance is great enough so that, if a strong current is present on a row or a column, it causes a voltage on this row or column that is measurable by the processor 10. As explained with reference to FIG. 8, a strong current is present on a row if an analog active snooper device 11 injects this strong current into this row. A strong current is present on a column if this column is short-circuited with a row on which the analog active snooper device 11 has injected this strong current.

In the example of FIG. 9, in which, for the sake of simplification, there is only one detection time interval (corresponding to the portion referenced P2 of the intermediate time slot IT), the processor implements the first mechanism (symbolized by the arrows referenced 91 and 93) during the portions referenced P1 and P3 of the intermediate time slot IT and it implements the second mechanism (symbolized by the arrow referenced 92) during the portion referenced P2.

In order to make the process of learning by the snooper device more complex, the processor 10 causes a random variation, from one intermediate time slot IT to another, of the number and/or position and/or duration of the detection time interval or intervals.

In one variant, the mechanism of protection according to this third embodiment is carried out only during a part of the intermediate time slot IT.

In another variant, the mechanism of protection according to this third embodiment is carried out only on certain rows and/or certain columns.

Figure 10:
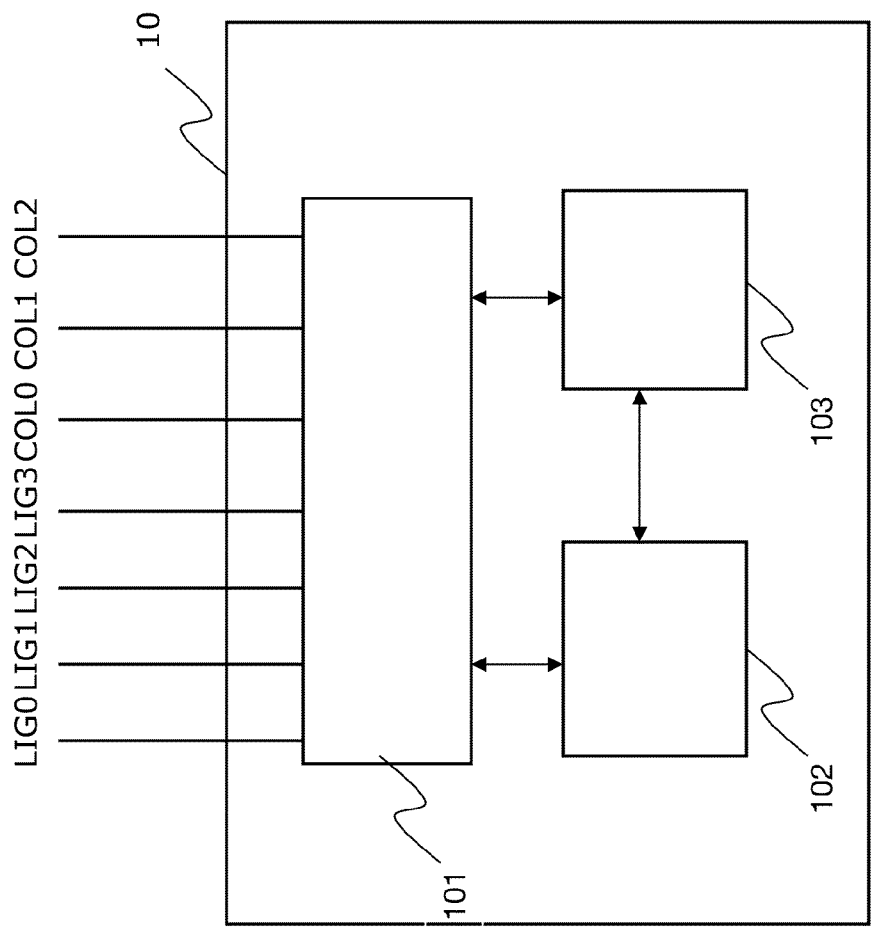
FIG. 10 presents the structure of a device for managing a matrix of keys of a keypad according to one particular embodiment of the invention.

FIG. 10 presents the structure of a device 10 for managing a matrix of keys of a keyboard according to one particular embodiment of the invention. This device implements the technique presented here above (in any one of the embodiments presented with reference to FIGS. 5 to 9).

In this example, the device comprises a RAM (random access memory) 103, a central processing unit or CPU 101, equipped for example with a processor and driven by a program stored in a ROM (read-only memory) 102. At initialization, the code instructions of the program are for example loaded into the RAM 103 and then executed by the processing unit 101. The processing unit 101 manages the signals on the rows and columns (LIG0 to LIG3 and COL0 to COL2 in this example) of the matrix of keys of the keypad according to the instructions of the program 102, in order to implement the technique presented here above (in any one of its embodiments).

This FIG. 10 illustrates only one particular way, among several possible ways, of carrying out the technique presented here above with reference to FIGS. 5 to 9. Indeed, the technique of the invention can be done equally well:
 on a reprogrammable computing machine (a processor or a microcontroller for example) executing a program comprising a sequence of instructions, or
 a dedicated computing machine (for example a set of logic gates such as an FPGA or an ASIC, or any other hardware module).

Should the invention be implanted in a reprogrammable computing machine, the corresponding program (i.e. the sequence of instructions) can be stored in a detachable storage medium (such as for example a floppy disk, a CD-ROM or a DVD-ROM) or non-detachable storage medium, this storage medium being partially or totally readable by a computer or a processor.

An embodiment of the disclosure provides a technique for the secured management, by a device (for example a processor), of a matrix of keys of a keypad.

An embodiment provides a technique of this kind to reduce or prevent the risks of snooping by an active snooper device capable of itself carrying out an iteration of the scan phase.

An embodiment provides a technique of this kind that is simple to implement and costs little.

Although the present disclosure has been described with reference to one or more examples, workers skilled in the art will recognize that changes may be made in form and detail without departing from the scope of the disclosure and/or the appended claims.

The invention claimed is:

1. A method for management, by a device, of a matrix of keys comprising at least one row and at least two columns, each key, when pressed, enabling short-circuiting of a row and a column of said matrix, the method comprising at least two iterations of a scan phase comprising the following steps for each of the rows processed successively:

writing a predetermined logic value to the row; and for each column, reading a logic value in the column to determine whether the column is short-circuited with the row, by comparison between the logic value read and the predetermined logic value, wherein, during at least one part of a time slot included between two successive iterations of the scan phase, the device carries out:

a first mechanism of protection comprising reading a logic value on at least one row or column, and detecting an attempt at illicit scanning as a function of the logic value read; and a second mechanism of protection comprising writing an arbitrary logic value, equal to or different from the predetermined logic value, to at least one row or column, so as to prevent an attempt at illicit scanning, wherein the device carries out the second mechanism of protection on at least one given row or column, during at least one part of the time slot except during at least one detection time interval, wherein during each detection time interval, the device carries out the first mechanism of protection, comprising reading a logic value on said at least one given row or column, and detecting an attempt at illicit scanning if the logic value read is different from said arbitrary logic value written by the second mechanism before said detection time interval, wherein each row or column to which the device writes, before said detection time interval, in carrying out the second mechanism of protection, is placed in a state of low impedance, wherein each row or column on which the device reads, during said detection time interval, in carrying out the first mechanism of protection, is placed in a state of high impedance, and wherein, for said at least one given row or column, the start of the detection time interval corresponds to a passage from said state of low impedance to said state of high impedance, giving rise to a voltage measurable by the device if a current resulting from an attempt at illicit scanning is present on said at least one given row or column.

2. The method according to claim 1, wherein the number and/or position and/or duration of the detection time interval or intervals vary randomly from one intermediate time slot to another.

3. The method according to claim 1, wherein the second mechanism of protection comprises writing an arbitrary logic value which changes within said time slot and/or from one intermediate time slot to another.

4. The method according to claim 3, wherein the change in arbitrary logic value within said time slot and/or from one intermediate time slot to another is random.

5. The method according to claim 1, wherein the device carries out the second mechanism of protection throughout said time slot, except during said at least one detection time interval, the device carrying out the first mechanism of protection during each detection time interval.

6. The method according to claim 1, wherein the device carries out the first and second mechanisms of detection on all the rows and columns.

7. A computer-readable and non-transient storage medium storing a computer program comprising a set of instructions executable by a computer or a processor to implement a method for management, by a device, of a matrix of keys comprising at least one row and at least two columns, each key, when pressed, enabling short-circuiting of a row and a column of said matrix, the method comprising at least two iterations of a scan phase comprising the following steps for each of the rows processed successively:

writing a predetermined logic value to the row; and for each column, reading a logic value in the column to determine whether the column is short-circuited with the row, by comparison between the logic value read and the predetermined logic value, wherein, during at least one part of a time slot included between two successive iterations of the scan phase, the device carries out:

a first mechanism of protection comprising reading a logic value on at least one row or column, and detecting an attempt at illicit scanning as a function of the logic value read; and a second mechanism of protection comprising writing an arbitrary logic value, equal to or different from the predetermined logic value, to at least one row or column, so as to prevent an attempt at illicit scanning, wherein the device carries out the second mechanism of protection on at least one given row or column, during at least one part of the time slot except during at least one detection time interval, wherein during each detection time interval, the device carries out the first mechanism of protection, comprising reading a logic value on said at least one given row or column, and detecting an attempt at illicit scanning if the logic value read is different from said arbitrary logic value written by the second mechanism before said detection time interval, wherein each row or column to which the device writes, before said detection time interval, in carrying out the second mechanism of protection, is placed in a state of low impedance, wherein each row or column on which the device reads, during said detection time interval, in carrying out the first mechanism of protection, is placed in a state of high impedance, and wherein, for said at least one given row or column, the start of the detection time interval corresponds to a passage from said state of low impedance to said state of high impedance, giving rise to a voltage measurable by the device if a current resulting from an attempt at illicit scanning is present on said at least one given row or column.

* * * * *